No. 746,023. Patented December 8, 1903.

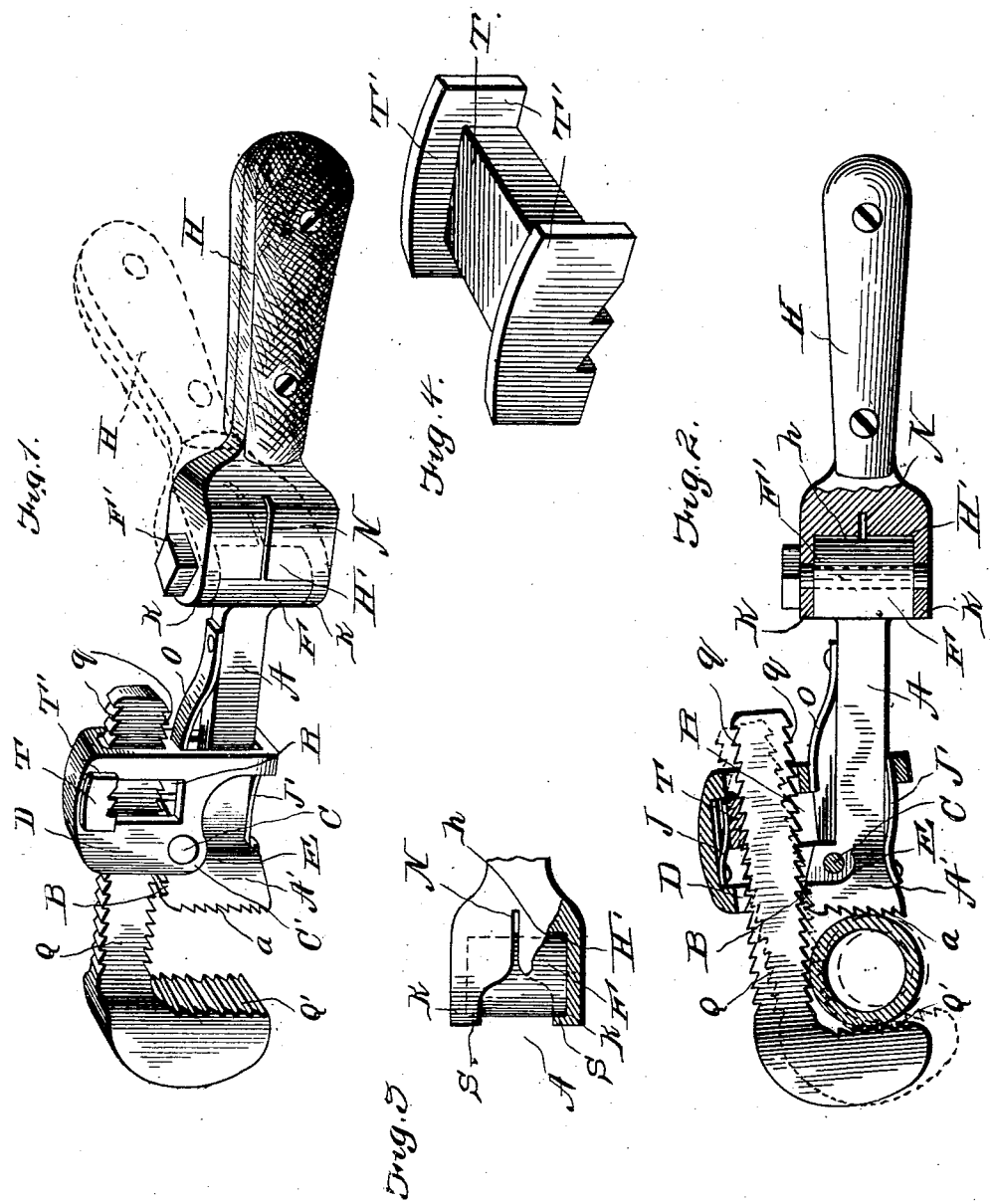

UNITED STATES PATENT OFFICE.

GEORGE R. CHEESMAN, OF AUBURN, NEW YORK.

WRENCH.

SPECIFICATION forming part of Letters Patent No. 746,023, dated December 8, 1903.

Application filed August 8, 1903. Serial No. 168,790. (No model.)

*To all whom it may concern:*

Be it known that I, GEORGE R. CHEESMAN, a citizen of the United States, residing at Auburn, in the county of Cayuga and State of New York, have invented new and useful Improvements in Wrenches, of which the following is a specification.

This invention relates to new and useful improvements in wrenches, and especially in the provision of an adjustable frictional clutch-joint whereby the jaws may be held at different angles to the handle of the wrench, thus adapting the tool for various uses.

The invention consists, further, in the provision of a wrench having a pivotal and spring-actuated stirrup mounted upon a fixed jaw and carrying a spring-actuated dog designed to engage teeth upon the shank portion of a sliding jaw and in the provision of a series of teeth upon an angled portion of the fixed jaw which coöperate with teeth upon one edge of the shank portion of a movable jaw to relieve the strain upon the spring-actuated dog as pressure is applied to the wrench in turning any object.

My invention consists, further, in various details of construction, combinations, and arrangements of parts, which will be hereinafter fully described and then specifically described in the appended claims.

I illustrate my invention in the accompanying drawings, in which—

Figure 1 is a perspective view of my improved wrench, showing the handle in dotted lines in an adjusted position. Fig. 2 is a longitudinal and central sectional view through the wrench. Fig. 3 is an enlarged detail view of a socket member forming a portion of the handle adapted to receive a cylindrical apertured end of the shank portion of the fixed jaw, and Fig. 4 is a perspective view of the spring-actuated dog.

Reference now being had to the details of the drawings by letter, A designates the shank portion of a fixed jaw of the wrench, having teeth $a$ along the edge of the head A' of said jaw, said series of teeth being in a line at right angles to said shank portion, and B designates a series of teeth formed upon an inclined portion of the head and in a line at an angle to the end of the head having the teeth $a$.

Pivotally mounted upon a pin C, which passes through an aperture in the shank portion A adjacent to its head, is a stirrup member D, which is chambered out to receive said shank portion A and has rounded portions C' adjacent to its pivotal point, which turn upon shoulders E formed in the opposite faces of the shank portion A, but one of said shoulders, however, being shown in the drawings.

The rear end of the shank portion A of the fixed jaw terminates in a cylindrical portion F, which has a central aperture running longitudinally through the same for the reception of a tightening-screw F', which forms a pivot upon which the handle H is mounted. Said handle H has its pivotal end enlarged, forming a socket portion H', which latter has a concaved recess $h$, made of a shape suitable to receive the cylindrical-shaped end F of the shank A and to turn thereon. Integral wings K upon the socket portion of the handle are adapted to project beyond the opposite edges of the concaved recess therein, and the marginal edges of said wings are convexed, conforming to the contour of the cylindrical end F of the shank portion A. Said socket portion has longitudinal slits N therein extending from the concaved marginal wall in the recessed handle toward the free end of the latter, whereby said wings may be allowed to have a slight flexible movement when a screw or other clamping means passing through the said wings and the apertured end of the shank portion of the fixed jaw are drawn together sufficiently to cause the inner faces of the wings to bind frictionally against the ends of said cylindrical end of the shank portion of the fixed jaw.

The sliding jaw Q of the wrench has a series of teeth Q' along one of the marginal edges of its angled end, which teeth coöperate with the teeth $a$ on the fixed jaws to grip and hold the article to be turned by the wrench, and said sliding jaw has a longitudinal movement through the stirrup member.

The opposite walls of the stirrup member have elongated apertures R therein, and I designates a dog having flanged edges T', which engage the outer faces of said stirrup member, and provided with a plurality of small teeth on the inner face of said dog. A spring J is interposed between the said dog and the wall of the stirrup member and is adapted to normally throw the dog so that the teeth therein will engage the teeth $q$ upon the outer marginal edge of the shank portion of the movable jaw and hold the same in a fixed position. Upon the opposite or inner edge of the shank portion of the sliding jaw is a series of teeth $q$, which are designed to engage the teeth B upon the inclined portion of the fixed jaw when the stirrup rocks upon its pivot and carrying with it the movable jaw, thereby relieving the strain upon the dog when the wrench is acting upon an article to be turned thereby.

A spring J' is secured to the outer edge of the fixed jaw, and its free end engages a portion of the stirrup which surrounds the shank portion A of the fixed jaw, while a second spring O is fastened on the opposite edge of the shank portion A, and its free end bears against a partition in the chambered portion of the stirrup member, the two springs serving to normally hold the stirrup member tilted forward to its farthest limit, said springs, however, yielding when pressure is applied to the outer edge of the sliding jaw for the purpose of allowing the teeth and the two jaws to securely grip an article to be acted upon by the wrench.

In Fig. 3 of the drawings I have shown the socket member forming a portion of the handle provided with flanges S about the wings of the socket portion, which flanges are adapted to surround portions of the circumferences of the cylindrical-shaped end of the shank portion of the fixed jaw for the purpose of securely holding the two parts of the adjustable wrench against excessive strain, this slight modification being preferably used upon wrenches which are adapted for heavy work.

In operation when the operator desires to use the wrench with the shank portions of the jaws at angles to the handle they may be easily and quickly adjusted by the operator striking the tool over the edge of a bench or other object with sufficient force to tilt the parts at an angle, and owing to the wings engaging the ends of the cylindrical portion of the shank A with such force the parts will be held ready for use in such position. By having the slits in the socket portion of the handle provision is made for taking up the wear incident to the turning of the parts which frictionally contact with one another. By drawing back the spring-actuated dog from engagement with the teeth on the outer edge of the sliding shank portion of the movable jaw the latter may be moved longitudinally into adjusted position, and by releasing the dog teeth on the latter will engage teeth on the movable jaw and hold the jaw in an adjusted position, and by applying pressure to the inner end of the shank portion of the sliding jaw the latter and also the pivoted stirrup carrying the same may be rocked, throwing the series of teeth upon the angled end of movable jaw into position to securely grip the object to be acted upon by the wrench, thus securing a good hold upon the same. When the wrench is applied to the object to be turned and pressure applied to the handle, the teeth B will engage teeth upon the inner margin of the sliding jaw, thus relieving the strain upon the spring-actuated dog which engages the teeth along the outer margin of the shank portion of the sliding jaw.

While I have shown a particular detailed construction illustrating the features of my invention, it will be understood that I may make alterations in the construction of the same, if desired, without departing from the spirit of the invention.

Having thus fully described my invention, what I claim as new, and desire to secure by Letters Patent, is—

1. A wrench having a shank portion, one end of which is turned in cylindrical form which is apertured, a handle having a socket portion adapted to receive said cylindrical end, frictional clamping-wings integral with said socket portion and a tightening-screw passing through the registered apertures in said wings and cylindrical portion, and adapted to cause said wings to frictionally engage the ends of said cylindrical portion, as set forth.

2. A wrench having a shank portion terminating in a cylindrical end at right angles thereto and apertured, a handle having a socket portion which is concaved, and the opposite walls of said concaved portion being slitted longitudinally with the handle, ears projecting from the socket member and forming the end walls of the recessed portion of the socket member, said socket member adapted to receive said cylindrical end of the shank portion of the wrench, the outer marginal edges of said ears conforming to and flush with the circumferences of the cylindrical portion, a screw passing through registered apertures in the cylindrical end of the wrench, and adapted to draw the ears frictionally against the ends of the cylindrical portion of the shank of the wrench, as set forth.

3. A wrench having a fixed jaw, a handle adjustably held by frictional clutch thereto, a stirrup member pivoted to the fixed jaw, a movable jaw having a shank portion mounted within said stirrup member, a spring-actuated dog carried by said stirrup member having teeth adapted to engage the teeth on the outer edge of the shank portion of the movable jaw, springs carried by the fixed jaw bearing against the stirrup member to throw the same to its outer limit, a series of teeth along the inner margin of the shank portion of the movable jaw, coöperating with teeth upon the inclined edge of the fixed jaw, whereby the strain upon the dog may be relieved while the wrench is under pressure in turning an object, as set forth.

In testimony whereof I have signed my name to this specification in the presence of two subscribing witnesses.

GEORGE R. CHEESMAN.

Witnesses:
 FRED M. HOSMER,
 CICERO J. WARNE.